United States Patent Office 3,407,244
Patented Oct. 22, 1968

3,407,244
COBALT SALT - BISARSINE - ORGANOMETAL CATALYSTS FOR PREPARING 1,4-DIENES
Christos Sarafidis, Wilmington, Del., assignor to E. I. du Pont de Nemours and Company, Wilmington, Del., a corporation of Delaware
No Drawing. Filed Oct. 31, 1967, Ser. No. 679,539
16 Claims. (Cl. 260—680)

ABSTRACT OF THE DISCLOSURE

A catalyst for use in preparing 1,4-dienes from α-monoolefins and conjugated dienes. The catalyst is prepared by mixing an organometal compound, a cobalt salt and a bisarsine in a liquid medium in any order, either in the presence of the monomers or separately. The reaction for preparing the 1,4-dienes is carried out in an inert organic solvent at temperatures of 25 to 150° C. and pressures ranging from 1 atmosphere absolute to 2000 p.s.i.g.

BACKGROUND OF THE INVENTION

Alpha-olefin elastomers are of increasing importance today. Particularly valuable are the copolymers containing sulfur-curable side-chain unsaturation resulting from incorporation of nonconjugated diene units. U.S. Patent 2,933,480 to Greshem et al. describes representative copolymers of this type. Nonconjugated dienes useful in making these copolymers include 1,4-hexadiene itself and derivatives wherein the monomer still has one terminal vinyl group, e.g., 4-methyl-1,4-hexadiene. Other 1,4-diene-containing elastomers are also important, for example, the copolymer prepared by copolymerizing isobutylene with 2-alkyl-1,4-hexadienes in the presence of a cationic catalyst, e.g., a Friedel-Crafts catalyst such as boron trifluoride or stannic chloride-water.

Various catalysts are known for use in synthesizing 1,4-dienes from α-monoolefins and conjugated dienes. French Patent 1,462,308 discloses making hexadiene with a ferric chloride-bisphosphine-organoaluminum catalyst and with a $CoX_2(R_2PCH_2CH_2PR_2)_2$ aluminum trialkyl catalyst where X is halogen and R is alkyl or phenyl. The bisphosphine catalyst disclosed in this publication and others of a similar nature, while being somewhat effective in catalyzing the desired reaction, are sometimes deficient with respect to their activity and stereoselectivity, i.e., their use results in the production of substantial amounts of undesirable by-products in addition to the desired 1,4-dienes.

Because of the great utility of aliphatic 1,4-dienes in making important elastomers, there has been a need for a catalyst system of high activity and ready availability which, when used in the reaction of conjugated dienes and α-monoolefins, produces the desired 1,4-dienes in good yield.

SUMMARY OF THE INVENTION

According to this invention a catalyst for use in preparing 1,4-dienes is prepared by mixing an organometal compound, wherein the metal is aluminum and/or magnesium, a cobalt salt, and a bisarsine of the formula:

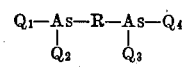

wherein each Q group is independently aryl, alkyl, cycloalkyl, aralkyl, alkaryl, or at least one of the pairs of Q groups $Q_1-Q_2$ and $Q_3-Q_4$ are joined together to form a saturated 5 or 6 membered ring, and R is ethylene, trimethylene or vinylene (—CH=CH—).

DETAILED DESCRIPTION

Ethylene is the preferred monoolefin for use in the present invention, being commercially available in large quantities at a very low price and, importantly, capable of combining with a conjugated diene to give a 1,4-diene having a terminal carbon-carbon double bond well suited for the reaction with coordination catalysts. Other α-monoolefins which can be used in this invention are those having the formula R—$CH_2$—CH=$CH_2$ where R is hydrogen, $C_1$–$C_{15}$ alkyl or halogenated $C_1$–$C_{15}$ alkyl. Of this group the commercially available members having up to about 6 carbon atoms are preferred; propylene is the most preferred because of its availability and the importance of the dienes formed when it is used. A preferred example of the halogenated alpha-monoolefin is 5,6-dibromo-1-hexene. Other examples of hydrocarbons and halogenated hydrocarbon alpha-monoolefins suitable for use in the present invention are given in U.S. Patent 3,222,330 to Nyce et al.

The conjugated dienes which are used in this invention are those having the formula:

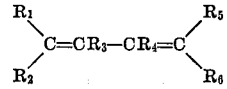

wherein each of the groups $R_1$ and $R_5$ is tolyl, halophenyl, phenyl, alkyl, hydrogen or $R_1$ and $R_5$ are joined together to form a cyclic diene containing up to 12 carbon atoms in the ring; each of $R_2$ and $R_6$ is alkyl or hydrogen and each of $R_3$ and $R_4$ is hydrogen, alkyl, aryl, alkaryl, aralkyl, or halo. The preferred conjugated diene for use in the present invention is 1,3-butadiene; it is commercially available in large quantities at an attractive price and when combined with ethylene, makes possible the preparation of 1,4-hexadiene which is a monomer particularly preferred for use in preparing sulfur-curable hydrocarbon elastomers by coordination catalysis. Other conjugated dienes which are useful in the present invention include isoprene, 1,3-pentadiene; 2,3-dimethyl-1,3-butadiene; 2,3-dichloro-1,3-butadiene; 1-phenyl-1,3-butadiene; 2-phenyl-1,3-butadiene; 1-p-tolyl-butadiene; 1,2-diphenyl-1,3-butadiene; 2,3-diphenyl-1,3-butadiene; 2-ethyl-1-phenyl - 1,3-butadiene and 1-p-chlorophenyl-1,3-butadiene.

Although the reaction of this invention involves the equimolecular addition of an alpha-monoolefin to a conjugated diene, it is not necessary to employ equimolar amounts of reactants. In typical batch operations the ratio of reactants can be continually changing. Both the alpha-monoolefin and the conjugated diene can be introduced into the reactor to establish a suitable value of the ratio before the reaction is initiated; thereafter additional alpha-monoolefin is fed therein during the course of the reaction until the desired conversion of the conjugated diene to the 1,4-diene is obtained. One or both of the reactants can be charged to the reaction vessel, continuously or intermittently during the reaction. In a preferred process, ethylene is maintained at practically a constant pressure over the diene (which is in solution as discussed hereinafter), until consumption of ethylene ceases. The proportions of reactants to be used in a given reaction may be routinely determined by one skilled in the art with reference to the example which follows:

The catalysts of this invention are prepared by mixing an organometal compound, a cobalt salt and a bisarine of the above-specified formula. A wide variety of organometal compounds or mixtures thereof can be employed. Suitable classes include the organomagnesiums; organomagnesium halides; triorganoaluminums; organoaluminum halides such as diorganoaluminum monohalides; organoaluminum dihalides and organoaluminum sesquihalides; diorganoaluminum hydrides and diorganoaluminum alkoxides wherein the alkoxy group contains about 1–8 carbon atoms. The organic groups in the organometal compounds include alkyl, aryl, aralkyl and alkaryl radicals and the halides are chloro, bromo or iodo.

The molecular weight of the organometal compound is not critical; in general practice there is usually no practical advantage in employing compounds wherein the individual organic groups have more than 18 carbon atoms. The preferred compounds are the organoaluminum halides, diisobutylaluminum monochloride being particularly preferred because of the fast rate of reaction which it induces and its availability. Of the triorganoaluminums and organomagnesiums used, triisobutylaluminum, methylmagnesium bromide and phenylmagnesium bromide are preferred for the same reasons. Isobutylaluminum dichloride and ethylaluminum sesquihalide are also particularly useful in this invention. Other useful representative organometal compounds include: tri-n-butylaluminum; diethylaluminum bromide; isobutylaluminum dibromide; diisopropylaluminum monochloride; di-n-hexylaluminum monochloride; di-n-amylchloroaluminum; isopropylaluminum dichloride; triphenylaluminum; diphenylaluminum monochloride; bis(p-tolyl)aluminum monochloride; bis(p - chlorophenyl)aluminum monochloride; bis(3,4 - dichlorophenyl)aluminum monochloride; bis(p-fluorophenyl)aluminum monochloride; dibenzylaluminum monochloride; butylmagnesium bromide; phenylmagnesium chloride, diethyl magnesium and polymeric organoaluminums such as aluminum isoprenyl. Similar compounds containing condensed aromatic rings such as diisobutylnaphthylaluminum are also suitable.

The organoaluminum compound is added in amounts such that there is at least 1 gram-atom of aluminum for each gram-atom of cobalt in the catalyst. Greater amounts of aluminum up to 200 gram-atoms or more per gram-atom of cobalt can be used but are not economical. The amounts of aluminum within this range to be used in order to form effective catalysts will vary with the cobalt salt employed, but can be routinely determined by one skilled in the art. In general, the higher valence cobalt salts require greater amounts of aluminum than the lower valence states and non-halogen cobalt salts require greater amounts than the cobalt halides. Representative minimum amounts of aluminum to be used are 1 gram-atom per gram-mole of cobalt (II) chloride, 4 gram-atoms of aluminum per gram-mole of cobalt (II) acetylacetonate and 5 gram-atoms of aluminum per gram-mole of cobalt (III) acetylacetonate. A preferred general ratio is about 5–15 gram-atoms of aluminum per gram-atom of cobalt. Aluminum present in this quantity is commercially feasible and gives excellent reaction rates. Magnesium can be used similarly.

A wide variety of cobalt salts can be used in this invention including those containing the cobalt atom in the (II) or (III) valence state. Representative examples are cobalt tris(acetylacetonate), cobalt bis(acetylacetonate), cobalt (II) chloride (CoCl$_2$), cobalt (II) bromide (CoBr$_2$), cobalt (II) iodide (CoI$_2$) and cobalt (II) diacetate. Preferred cobalt salts are cobalt (II) acetylacetonate, cobalt (III) acetylacetonate, cobalt (II) chloride, and cobalt (II) bromide because of their high activity and ready availability.

The bisarsine,

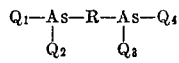

is a necessary component of the catalyst along with the cobalt salt and organometal compound. The R group of this formula is ethylene (—CH$_2$—CH$_2$—), trimethylene (—CH$_2$—CH$_2$—CH$_2$—), or vinylene (—CH=CH—). The Q groups are C$_6$–C$_{15}$ aryl, C$_1$–C$_{18}$ alkyl, C$_4$–C$_8$ cycloalkyl, C$_7$–C$_{18}$ aralkyl, C$_7$–C$_{18}$ alkaryl or the pairs of Q groups, Q$_1$–Q$_2$ and/or Q$_3$–Q$_4$ are joined together to form a saturated 5 or 6 membered ring, said ring containing one of the arsenic atoms indicated in the formula and the remaining members being carbon atoms. These bisarsines can be made by the general procedures described in Advances in Organometallic Chemistry, vol. 4, ed. by F. G. A. Stone and R. West, Academic Press, New York, 1966, the section by W. R. Cullen entitled "Organoarsenic Chemistry" (pages 145–242). Suitable information can also be found in Die Chemie der Metall-Organischen Verbinungen by E. Krause and A. von Grosse, Borntraeger, Berlin, 1937. Catalysts of particularly good performance are formed when all of the Q groups are phenyl. The preferred compound is ethylenebis[diphenylarsine]; detailed illustrations of its use are given in the example. Other representative bisarsines include: ethylenebis[ethyl phenylarsine]; ethylenebis[methyl phenylarsine]; ethylenebis[butyl phenylarsine]; ethylenebis[benzyl phenylarsine]; ethylenebis[dibenzylarsine]; ethylenebis[dicyclohexylarsine]; ethylenebis[diethylarsine]; ethylenebis[dihexylarsine]; trimethylenebis[diphenylarsine]; vinylenebis[diphenylarsine]; and ethylenebis[tolyl phenylarsine]. The proportions are selected such that at least 0.5 gram-mole of bisarsine is present for every gram-atom of cobalt. The preferred ratios of gram-moles bisarsine:gram-atoms cobalt are in the range of 0.5–2:1; catalysts so formed have high activities and form a minimum of by-products. Since the bisarine is the most expensive component of the catalysts, higher proportions than 2:1 are ordinarily not used, the upper limit being dictated by economics.

The catalyst components are mixed together in a liquid medium, usually the hereinafter-described inert organic diluent in which the reaction is carried out. The components can be mixed separately or in situ in the presence of the monomer reactants. The order is not critical and allows for a variety of procedures to be used at the convenience of one skilled in the art. To avoid undesirable side reactions however, it is preferred that the cobalt compound and the bisarsine be brought together before the organometal compound and both of the reactants are present. When this procedure is followed, the organometal is added to the other two catalyst components before or after the alpha-monoolefin and the diene are present.

The preparation of the catalyst and its use in effecting the formation of 1,4-dienes from alpha-olefins and conjugated dienes can be carried out over a wide range of temperatures. Values varying from about 25° C. to about 150° C. can be used. At temperatures below about 80° C, the rate may slow down too much for operating convenience. The preferred temperature range lies between 80 and 120° C., about 90–100° C. being particularly preferred for practical operation and good rates of reaction.

The proportion of the catalyst in the monomer reaction zone can be varied widely. For economic reasons, it is desirable to use as little catalyst as possible consistent with a reasonable rate; a lower limit being at least about .001 millimole of the cobalt compound per mole of diene used. Typical proportions are illustrated by the example which follows, though proportions outside these ranges can be employed, if desired. Those skilled in the art can determine the optimum amount of a particular catalyst for a particular set of monomers by routine experiments.

The pressure employed will vary with the volatility of the monomers and inert medium used and the reaction temperatures selected. A practical range of pressures for generally available reactors is from about 1 atmosphere absolute to about 2000 p.s.i.g. In order to operate at temperatures at which product formation takes place at a convenient rate, it may be necessary to maintain superatmospheric pressure to liquify the diene.

The reaction is carried out in an inert organic diluent. By "inert" it is meant that the diluent will not deactivate the catalyst; thus it does not contain groups bearing Zerewitinoff-active hydrogen atoms, for example, hydroxyl groups, carboxyl groups, and the like and it is free from impurities such as alcohol and water bearing these substituents. Oxygen and carbon monoxide should also be excluded. For optimum yields, the diluent should not undergo side reactions with the catalyst, the monomers, or the 1,4-diene products. Purification of the diluent and monomers can be carried out by the procedures familiar to those skilled in the art of coordination catalysis where organometal compounds are involved. If it is desired to isolate the 1,4-diene from the reaction mixture, it is preferable that the diluent be easily separable; the boiling point of the diluent should thus be different enough from that of the diene product to afford convenient fractionation. Representative suitable diluents include: tetrachloroethylene, methylene chloride, chlorobenzene, aromatic hydrocarbons such as benzene and toluene; and aliphatic and cycloaliphatic hydrocarbons such as hexane and decalin respectively. Generally, the greatest catalyst activity occurs in chlorinated hydrocarbons. It is believed that any diluent useful for conducting the coordination catalyzed polymerization of hydrocarbon monomers can be used here. The conjugated diene itself, for example 1,3-butadiene, can serve as the diluent.

The 1,4-diene can be prepared by the process of the present invention in a batch reactor or in a continuous reactor. The reaction time is selected to carry out the desired conversion of 1,4-diene and can vary widely. Optionally, the reaction is stopped by adding a minimal amount of Zerewitinoff-active hydrogen compound, frequently a low molecular weight alcohol such as isopropanol, to deactivate the catalyst. After the reaction has stopped, the gases are let off and the liquid directly distilled, the 1,4-diene being separated by fractionation. Representative separation procedures are given in the example which follows. The reaction mixture which continually overflows from a continuous reaction zone is treated by suitable continuous or batch purification and fractionation procedures to yield the 1,4-diene, the catalyst being recycled for reuse when desired.

As will be apparent from the following example, this invention provides readily available catalysts which exhibit excellent performance with respect to the rates of reaction which they induce and yields of 1,4-dienes obtained.

EXAMPLE

In this example seven experiments are carried out to illustrate the preparation of cis-1,4-hexadiene from ethylene and 1,3-butadiene. The reactions are carried out in a 1.9-liter stainless steel pressure reactor fitted with a mechanical stirrer, two gas inlet tubes, two pressure funnels for injection of catalyst solutions, a port for the charging of solids (e.g. cobalt salts, bisarsines), a 10-milliliter tube for the taking of samples while the reactor is under pressure, a rupture disc, a thermocouple well, and an outlet leading through an overflow bomb to a back-pressure regulator. The back-pressure regulator is set to vent at pressures 20 p.s.i.g. above the operating pressure specified in the table below.

The following purification precautions are taken: ethylene is passed through a molecular sieve column prior to entry into the reactor. 1,3-butadiene is passed through another molecular sieve, added to a 500-milliliter stainless steel cylinder for weighing, and transferred from there to the reactor in the vapor phase with cooling of the reactor by a mixture of crushed solid carbon dioxide and acetone.

The solvent is dried and deoxygenated before use.

The reactions are carried out as follows: after the reactor has been flushed with nitrogen, it is charged with solvent and—in runs where the catalyst is not preformed—with the cobalt salt and bisarsine. The reactor is cooled and charged with butadiene. When the reactor has subsequently been heated to the temperature called for in the table below, ethylene is added up to the desired pressure. Then the solution of the organometal compound in 10 milliliters of solvent is added. In the runs where the catalyst is preformed, the solution of catalyst in 50 milliliters of solvent is added through the catalyst injection tubes at the desired reaction temperature and pressure.

As the reaction proceeds, ethylene is supplied on demand. At the end, the catalyst is deactivated by injection of one to two milliliters of isopropanol. Gases are then vented off. The 1,4-hexadiene content of the residual liquid is determined by gas chromatography.

In those runs where the catalyst is preformed prior to mixing with the monomers it is prepared as follows: the neat organometal compound is added to a solution of the cobalt compound and ethylenebis[diphenylarsine] in 50 milliliters of the reaction solvent at room temperature. The preformed catalyst thus obtained is aged at room temperature for the time specified in the table before being used.

Results of the 1,4-hexadiene syntheses are indicated in the table which follows: these results demonstrate the exceptional performance of the catalysts of this invention in producing high yields of 1,4-hexadiene in relatively short reaction times.

TABLE.—PREPARATION OF CIS-1,4-HEXADIENE FROM ETHYLENE AND 1,3-BUTADIENE

| Run No. | Co Salt | $(PhAs)_2(Ch_2)_n$ | Organometal compound | 1,3-butadiene (g.) | Solvent (ml.) | Temp. (°C.) | Press (p.s.i.g.) | Time (min.) | Cis-1,4-hexadiene produced (g.) |
|---|---|---|---|---|---|---|---|---|---|
| 1[1] | Co(AcAc)₃ 0.5 m. mole. | n-2 1 m. mole. | DIBAC, 5 m. moles. | 97 | PhCl, 600 | 96–104 | 92–104.5 | 30 | 89 |
| 2 | CoI₂ 0.5 m. mole | do | do | 61 | PhCH₃, 500 | 90–92 | 96–105 | 147 | 68 |
| 3 | CoBr₂ 0.5 m. mole | do | do | 73 | PhCH₃, 500 | 92–101 | 95–104 | 81 | 85 |
| 4 | CoCl₂ 0.5 m. mole | do | do | 85 | PhCH₃, 500 | 94–99 | 96.5–106 | 362 | 106.5 |
| 5[2] | Co(AcAc)₃ 0.5 m. mole | do | TIBA, 5 m. moles | 78 | PhCH₃, 500 | 95–100 | 100–105 | 180 | 37.6 |
| 6 | do | do | CH₃MgBr 6 m. moles. | 71 | PhCl, 500 | 94–96 | 96–106 | 82 | 30 |
| 7 | do | do | do | 71 | PhCH₃, 500 | 92–96 | 98–108 | 231 | 23.5 |

[1] Preformed catalyst aged 46 min.
[2] Preformed catalyst aged 58 min.
DIBAC=dissobutylaluminum monochloride.
TIBA=triisobutylaluminum
AcAc=acetylacetonate.
Ph=phenyl.

What is claimed is:

1. An organometal cobalt salt-bisarsine catalyst prepared by the process which comprises mixing a cobalt salt, an organometal compound, wherein the metal is at least one of aluminum or magnesium, and a bisarsine having the formula:

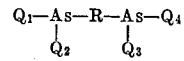

wherein each Q group is independently $C_6$–$C_{15}$ aryl, $C_1$–$C_{18}$ alkyl, $C_4$–$C_8$ cycloalkyl, $C_7$–$C_{18}$ aralkyl, $C_7$–$C_{18}$ alkaryl or at least one of the pairs $Q_1$–$Q_2$ and $Q_3$–$Q_4$ is joined together to form a saturated 5 or 6 membered ring, said ring containing the arsenic atom and the remaining members being carbon atoms, and R is ethylene, trimethylene, or vinylene; said components being mixed in such proportions that there is at least 0.5 gram-mole of bisarsine per gram-atom of cobalt and at least 1 gram-atom of aluminum or magnesium per gram-atom of cobalt.

2. The catalyst of claim 1 wherein the cobalt salt is cobalt (III) acetylacetonate, cobalt (II) acetylacetonate, cobalt (II) chloride, cobalt (II) bromide, cobalt (II) iodide or cobalt (II) acetate and the bisarsine is ethylenebis[diphenylarsine]; ethylenebis[ethyl phenylarsine]; ethylenebis[methyl phenylarsine]; ethylenebis[butyl phenylarsine]; ethylenebis[benzyl phenylarsine]; ethylenebis[dibenzylarsine]; ethylenebis[dicyclohexylarsine]; ethylenebis[diethylarsine]; ethylenebis[di-n-hexylarsine]; trimethylenebis[diphenylarsine]; vinylenebis[diphenylarsine] or ethylenebis[tolyl phenylarsine].

3. The catalyst of claim 2 wherein the organometal compound is at least one from the group of compounds consisting of organomagneisum halides; diorganomagnesiums; triorganoaluminums, diorganoaluminum monohalides; organoaluminum dihalides; organoaluminum sesquihalides; diorganoaluminum hydrides or diorganoaluminum alkoxides, wherein the organo groups are $C_1$–$C_{18}$ alkyl, $C_6$–$C_{15}$ aryl, $C_7$–$C_{18}$ alkaryl, or $C_7$–$C_{18}$ aralkyl; the halides are chloride, bromide or iodide and the alkoxy groups are $C_1$–$C_8$.

4. The catalyst of claim 3 wherein the organometal compound is at least one of triisobutylaluminum, diisobutylaluminum monohalide, diethylaluminum halide, isobutylaluminum dihalide, ethylaluminum sesquihalide, methylmagnesium halide, dimethylmagnesium, phenyl magnesium halide or diethylmagnesium, wherein the halide is chloride, bromide or iodide.

5. The catalyst or claim 3 wherein the bisarsine is ethylenebis[diphenylarsine], trimethylenebis[diphenylarsine] or vinylenebis[diphenylarsine].

6. The catalyst of claim 5 wherein the organometal compound is at least one of triisobutylaluminum, diisobutylaluminum monohalide, diethylaluminum halide, isobutylaluminum dihalide, ethylaluminum sesquihalide, methylmagnesium halide, dimethylmagnesium, or phenylmagnesium halide wherein the halide is chloride, bromide or iodide.

7. The catalyst of claim 6 wherein the bisarsine is ethylenebis[diphenylarsine] and the organometal compound is diisobutyl aluminum chloride, triisobutyl aluminum or methylmagnesium bromide.

8. The catalyst of claim 7 wherein the cobalt salt is cobalt (III) acetylacetonate, cobalt (II) acetylacetonate, or cobalt (II) chloride and the organoaluminum compound is diisobutyl aluminum chloride.

9. The catalyst of claim 8 wherein the components are present in proportions such that there is 0.5–2.0 grammoles of bisarsine per gram-atom of cobalt and 5–15 gram-atoms of aluminum per gram-atom of cobalt.

10. In a process for the preparation of an aliphatic 1,4-diene which comprises reacting, in the presence of a catalyst, an α-monoolefin with a conjugated diene; the improvement which comprises using as the catalyst the product of claim 1.

11. In a process for the preparation of an aliphatic 1,4-diene which comprises reacting, in the presence of a catalyst, an α-monoolefin with a conjugated diene; the improvement which comprises using as the catalyst the product of claim 3.

12. The process of claim 11 wherein the α-monoolefin is ethylene or propylene and the conjugated diene is 1,3-butadiene, 2-methyl-1,3-butadiene, 1,3-pentadiene or 2,3-dimethyl-1,3-butadiene.

13. The process of claim 11 wherein the α-monoolefin is ethylene and the conjugated diene is 1,3-butadiene.

14. The process for the preparation of an aliphatic 1,4-diene which comprises reacting, in the presence of a catalyst, an α-monoolefin with a conjugated diene; the improvement which comprises using as the catalyst the product of claim 7.

15. The process of claim 14 wherein the α-monoolefin is ethylene and the conjugated diene is 1,3-butadiene.

16. In a process for the preparation of 1,4-hexadiene comprising reacting ethylene and 1,3-butadiene in the presence of a catalyst, the improvement which comprises using as the catalyst the product of claim 9 in an amount such that there is at least about .001 millimole of the cobalt salt per mole of conjugated diene.

References Cited

FOREIGN PATENTS 1,462,308  11/1966  France.

PAUL M. COUGHLAN, JR., *Primary Examiner.*